United States Patent [19]

Masuda

[11] Patent Number: 4,731,630

[45] Date of Patent: Mar. 15, 1988

[54] DISPLAY DEVICE

[75] Inventor: Kosuke Masuda, Kawaskai, Japan

[73] Assignee: Nippon Kogaku K. K., Tokyo, Japan

[21] Appl. No.: 871,929

[22] Filed: Jun. 9, 1986

[30] Foreign Application Priority Data

Jun. 17, 1985 [JP] Japan .................... 60-91412[U]

[51] Int. Cl.[4] ............................................. G03B 17/18
[52] U.S. Cl. ..................................... 354/475; 354/472
[58] Field of Search ............... 354/465, 471, 472, 474, 354/475

[56] References Cited

U.S. PATENT DOCUMENTS

| 4,309,091 | 1/1982 | Fukuhara et al. | 354/475 |
|---|---|---|---|
| 4,589,754 | 5/1986 | Maitani et al. | 354/472 |
| 4,611,897 | 9/1986 | Hara et al. | 354/475 |
| 4,639,113 | 1/1987 | Ohkubo | 354/472 |

FOREIGN PATENT DOCUMENTS

| 0013331 | 2/1977 | Japan | 354/475 |
|---|---|---|---|
| 0040817 | 4/1981 | Japan | 354/474 |
| 0062039 | 4/1982 | Japan | 354/475 |

Primary Examiner—Russell E. Adams
Attorney, Agent, or Firm—Shapiro and Shapiro

[57] ABSTRACT

An information display device comprises a scale display including segments arranged in a line in one direction in the display area and a character display arranged in the display area for displaying characters and/or numerals. The character display includes display elements arranged along the same line of the scale display and at least a portion of the display elements of the character display are arranged between segments of the scale display.

17 Claims, 12 Drawing Figures

DISPLAY DEVICE

BACKGROUND OF THE INVENTION

1. Field of the Invention

The present invention relates to a display device having a function to display information such as numeric or character information and a function to display a scale, and more particularly to a display device suitable to display camera information.

2. Related Background Art

Cameras are being rapidly improved through increased use of electronics. For example, exposure control has been multiplexed to permit all or portions of four modes to be selected, a manual mode (M mode) in which a photographer decides both a stop value and a shutter time, an aperture priority mode (A mode) in which the photographer decides the stop value and the camera automatically decides a proper shutter speed, a shutter speed priority mode (S mode) in which the photographer decides the shutter time and the camera automatically decides a proper stop value, and a program mode (P mode) in which the camera automatically decides both a proper stop value.

In a camera having such a variety of photographing modes, the shutter time automatically selected by the camera in the A mode and P mode and the stop value automatically selected by the camera in the S mode are numerically displayed in a finder. On the hand, in the M mode, the photographer will often make a special photograph and he/she may intentionally photograph with overexposure or underexposure rather than a proper exposure. Accordingly, a degree of overexposure or underexposure, according to the exposure condition determined by the stop value and the shutter time selected by the photographer, is usually displayed as a scale in the finder. However, locations in the finder at which the display device can be arranged are limited, and if the numeric display and the scale display are spaced too far apart, the photographer cannot readily see them.

The applicant of the present invention has filed a patent application on a display device which can display the numeric information and the scale information in the same display area (U.S. Ser. No. 782,104 filed on Sept 30, 1985, now U.S. Pat. No 4,639,113).

In the display device of the above application, display elements for displaying the numeric information are arranged at the left half of the display area, and display elements for displaying the scale information are arranged at the right half of the display area.

In this display device, however, the limited narrow display area in the finder is divided into two sub-areas in which the respective display means are arranged. As a result, a scale which is sufficiently long to allow easy viewing is not provided.

Further, since the numeric information and the scale information are displayed in different display areas, the view directions of the photographer are different for the respective displays and the photographer cannot easily watch them.

SUMMARY OF THE INVENTION

It is an object of the present invention to provide a display device which can display easy-to-view scale information and which can display character information and the scale information at a common display area.

The present display device comprises scale means including segments arranged in a line in one direction in the display area and character display means arranged in the display area for displaying characters and/or numerals. The character display means includes display elements arranged along the same line of the scale display means. At least one of the display elements of the character display means has portions arranged between adjacent segments of the scale display means.

In a preferred embodiment of the present invention, the segments of the scale display means include a plurality of dot segments arranged in a line at a predetermined pitch over a sufficiently long extent in the display area.

The character display means includes a plurality of display elements each comprising a plurality of segments. Two segments of one character display element are respectively arranged on the opposite sides of one or a group of dot segments of the scale display means along said line.

DESCRIPTION OF THE PREFERRED EMBODIMENTS

Figure 1:
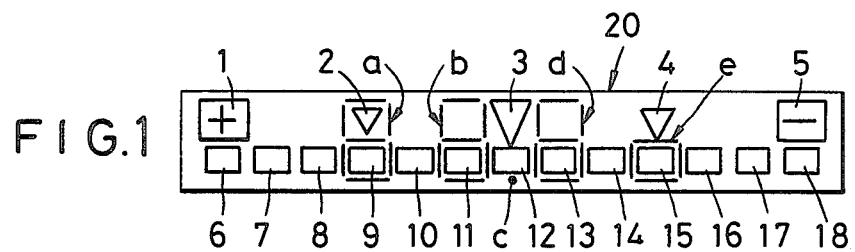
FIG. 1 is a plan view for showing an arrangement of display segments in one embodiment of the display device of the present invention.

FIG. 1 shows an arrangement of segments of a display device arranged in a view field of a finder of a camera.

Figure 2:
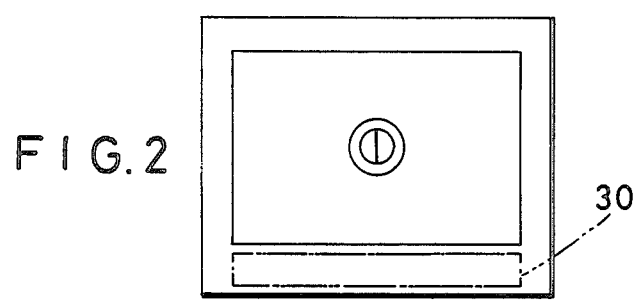
FIG. 2 shows a view field of a finder of a camera.

A display unit 20 is arranged in a display area 30 at a bottom of the view field of the finder of the camera as shown in FIG. 2. Segments 1-18 of scale display means and segment elements a-e of the character display means are arranged on the display unit 20. The scale display segments 1-18 display an exposure index (exposure condition) set by a photographer in the M mode as a bar graph, and comprise the (+) mark segment 1 for indicating overexposure, the index segment 2 for indicating +1 stage position, the index segment 3 for indicating a proper exposure position, the index segment 4 for indicating a −1 stage position, the (−) mark segment 5 for indicating underexposure, and the scale segments 6-18 linearly arranged over the display area 30 to correspond to the segments 1-5 to indicate an exposure index in the M mode by ON or OFF states of the segments.

The character display segment elements a-e comprise the 7-segment element a arranged between the segments 8 and 10 to surround the segment 9 and the index segment 2, the 7-segment element b arranged between the segments 10 and 12 to surround the segment 11, the dot segment c arranged below the segment 12, the 7-segment element d arranged between the segments 12 and 14 to surround the segment 13, and the 4-segment element e arranged between the segments 14 and 16 to surround the segment 15.

Figure 3:
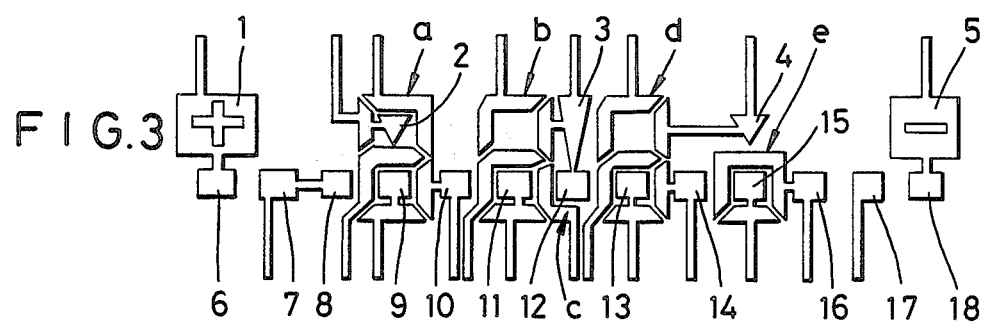
FIG. 3 shows an electrode pattern for the device shown in FIG. 1.
Figure 4:
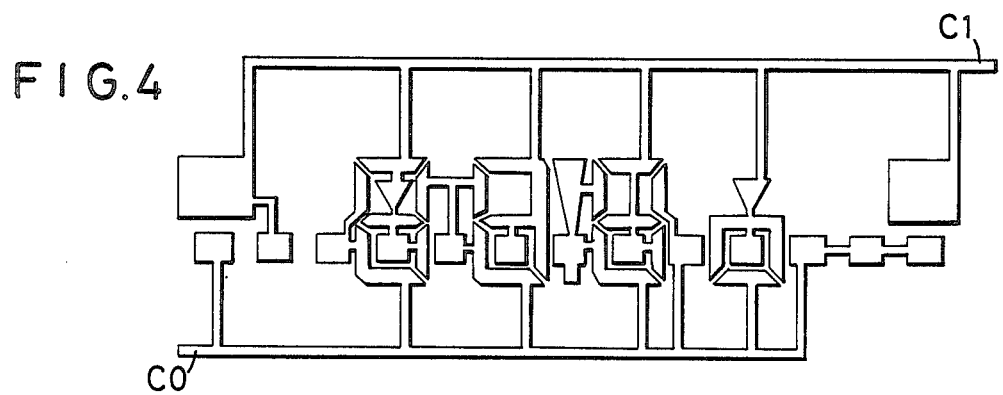
FIG. 4 shows a common electrode pattern.

An electrode pattern for the scale display segments 1-18 and the character display segment elements a-e for a liquid crystal display element (LCD) is shown in FIG. 3, and a common electrode pattern therefor is shown in FIG. 4. A drive method for the LCD is a ½ bias-½ duty system.

Figure 5:
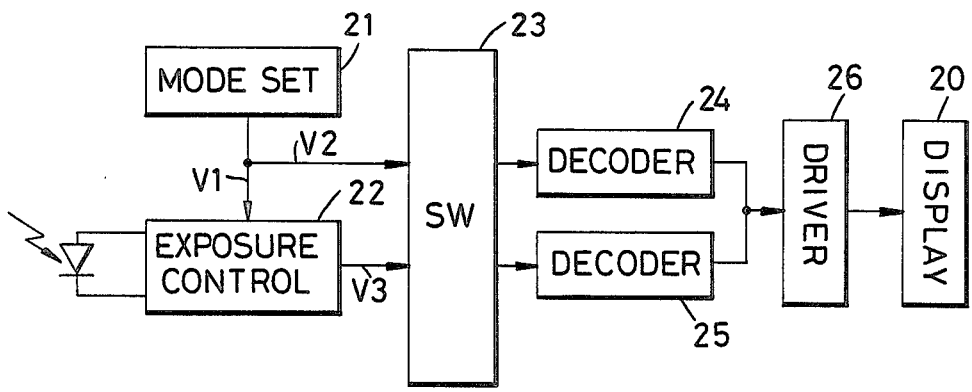
FIG. 5 is a block diagram of a control circuit.
Figure 6:
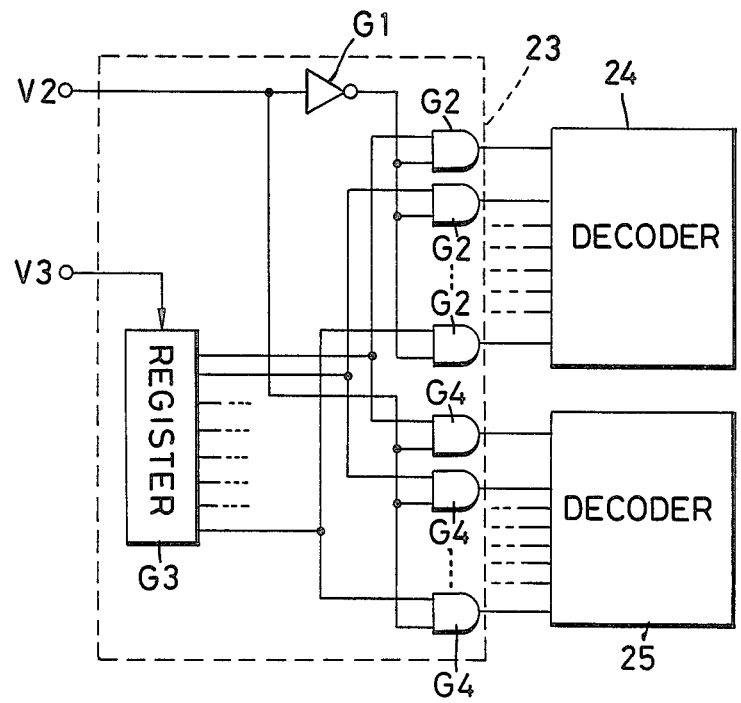
FIG. 6 shows a detailed circuit of a portion of the control circuit.

Referring to FIGS. 5 and 6, a control circuit for controlling the display device 20 will now be explained.

A mode setting circuit 21 sends to an exposure control circuit 22 a mode signal V1 corresponding to one of the M, A, S and P modes selected by the photographer, and sends to a switching circuit 23 a switching singal V2 which is H level when the M mode is selected and L level when other than M mode is selected.

The exposure control circuit 22 responds to the mode signal V1 to control the exposure in the mode selected by the mode setting circuit 21 and sends to the switching circuit 23 a code signal V3 for an exposure control value. When the M mode is selected, the code signal V3 is the code signal for displaying the scale, that is, a signal representing a deviation and a direction of an exposure condition determined by a manually set stop value and shutter time from a proper exposure value. When the A, S or P mode is selected, the code signal V3 is the code signal for displaying characters and numerals, that is, a signal representing an automatically selected stop value and/or shutter time in the respective mode.

When the M mode is selected and the switching signal V2 is H level, the switching circuit 23 sends the code signal for displaying the scale to a scale display decoder 25, and when the A, S or P mode is selected and the switching signal V2 is L level, the switching circuit 23 sends the code signal V3 for displaying characters to a character display decoder 24.

Output terminals of the decoders 24 and 25 are connected to an input terminal of a driver 26. The driver 26 receives the segment signal decoded by the decoder 24 or 25 and converts the segment signal to a segment drive signal to drive the display unit 20.

As shown in FIG. 6, the switching circuit 23 comprises an inverter G1 which receives the switching signal V2, a register G3 which temporarily stores the code signal V3, as many AND gates G2 as the number of output terminals of the register G3, each having one input terminal connected to the output terminal of the register G3 and another input terminal connected to the output terminal of the inverter G1, and as many AND gates G4 as the number of output terminals of the register G3, each having one input terminal connected to receive the switching signal V2 and another input terminal connected to an output terminal of the register G3.

The outputs of the AND gates G2 are connected to the respective input terminals of the decoder 24, and the output terminals of the AND gates G4 are connected to the respective input terminals of the decoder 25.

The operation is described below. When the photographer selects the A mode, the mode setting circuit 21 sends the mode signal V1 corresponding to the A mode to the exposure control circuit 22, and the L level switching signal V2 to the inverter G1 and the AND gates G4 of the switching circuit 23. The exposure control circuit 22 sends the code signal V3 for digitally displaying the exposure control value to the register G3 of the switching circuit 23.

Accordingly, an H level signal from the inverter G1 is applied to the first input terminals of the AND gates G2 and the code signal V3 from the register G3 is sent to the decoder 24 through the AND gates G2. The decoder 24 converts the code signal V3 to the segment signal, which is sent to the driver 26. The driver 26 converts the segment signal supplied from the decoder 24 to the segment drive signal by which the display unit 20 is driven.

Figure 7:
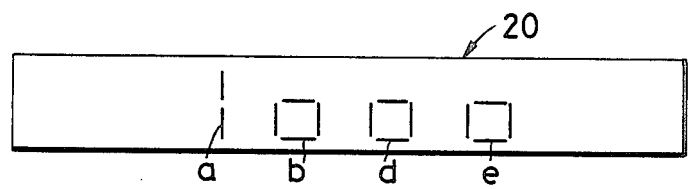
FIG. 7 shows a display in an A mode or a P mode.

In the A mode the display unit 20 displays as shown in FIG. 7. In the display shown in FIG. 7, 1/1000 second is displayed by the character display elements a, b, d and e as the shutter time selected by the exposure control circuit 22 in the A mode.

When the P mode is selected, the shutter time selected by the exposure control circuit 22 is displayed as shown in FIG. 7 in the same manner as in the A mode.

Figure 8:
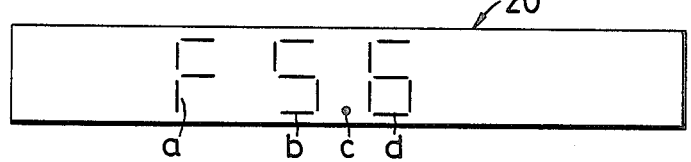
FIG. 8 shows a display in an S mode.

When the S mode is selected, the segment signal is set from the decoder 24 to the driver 26 as is done in the A mode, and the driver 26 converts the segment signal to the segment drive signal by which the display unit 20 is driven. The display unit 20 then displays as shown in FIG. 8. In the display shown in FIG. 8, F 5.6 is displayed by the character display elements a, b, c and d as the stop value selected by the exposure control circuit 22 in the S mode.

When the M mode is selected, the mode signal V1 corresponding to the M mode is sent to the exposure control circuit 22 and the H level switching signal V2 is sent to the inverter G1 of the switching circuit 23 and the AND gates G4. The exposure control circuit 22 sends the code signal V3 for scale-displaying the exposure control value to the register G3 of the switching circuit 23.

Accordingly, the H level signal from the mode setting circuit 21 is sent to the first input terminals of the AND gates G4, the code signal V3 from the register G3 is sent to the decoder 25 through the AND gates G4, and the decoder 25 converts the code signal V3 to the segment signal for display, which is sent to the driver 26. The driver 26 converts the segment signal from the decoder 25 to the segment drive signal by which the display unit 20 is driven.

Figure 9:
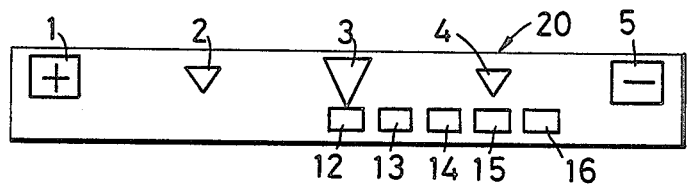
FIGS. 9 and 10 show displays in an M mode.
Figure 10:
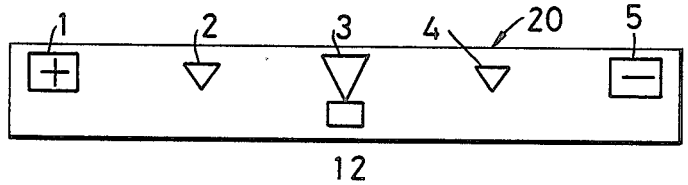

The display unit 20 thus displays as shown, for example, in FIG. 9 or 10. In the display shown in FIG. 9, the fact that the exposure index (exposure condition) determined by the shutter time and the stop value set by the photographer in the M mode is under by 1½ stage relative to the proper exposure value is displayed as a bar graph by the ON-states of the (+) mark segment 1, index segments 2, 3 and 4, (−) mark segment 5, and scale segments 12, 13, 14, 15 and 16.

In the display shown in FIG. 10, the fact that the exposure index set by the photographer in the M mode is the proper exposure value is displayed by the ON-states of the (+) mark segment 1, index segments 2, 3 and 4, (−) mark segment 5 and segment 12.

Figure 11:
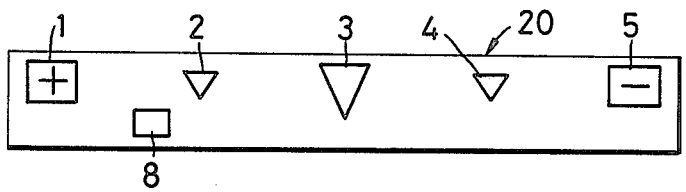
FIGS. 11 and 12 show displays in other embodiments.
Figure 12:
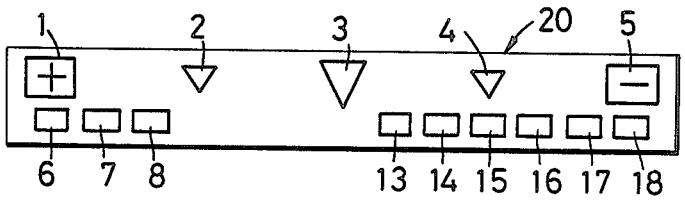

In FIG. 11, the arrangement of the scale display segments 1-18 is same as that in the above embodiment but only one of the scale display segments 6-18 is turned on. In FIG. 12, the ON-states and the OFF-states of the segments 6-18 are opposite to those in the above embodiment.

In the display of FIG. 11, the fact that exposure index (exposure condition) in the M mode is over by 1½ stage relative to the proper exposure value is displayed.

In the display shown in FIG. 12, the fact that the exposure index is over by 1 stage relative to the proper exposure value is displayed.

In the above embodiment, the display unit 20 is constructed as an LCD, although it may be constructed with light emitting diodes (LED).

The shape of the segments of the scale display segments is not limited to that of the above embodiments. For example, each of the scale segments 6-18 may be divided into two or three so that each of the character display elements a, b, d and e surrounds two or three scale segments.

What I claim is:

1. An information display device comprising:
   a display substrate;
   scale display means including a plurality of scale segments linearly arranged on said substrate in spaced relationship with each other; and
   character display means including at least one character display element arranged on said substrate, said display element substantially surrounding at least one of said scale segments and having portions interposed between adjacent scale segments of said scale display means.

2. An information display device according to claim 1, further comprising means for alternatively driving said scale display means and said character display means.

3. An information display device according to claim 1, wherein said scale segments are of substantially the same size and shape and arranged at regular intervals.

4. An information display device according to claim 1, wherein said display element substantially surrounds only one of said scale segments.

5. An information display device according to claim 1, wherein said display element comprises a plurality of character segments arranged to display numeric information.

6. An information display device according to claim 5, wherein at least two of said character segments are interposed each between a different pair of adjacent sale segments.

7. An information display device according to claim 1, wherein said scale display means includes a reference display element which indicates a reference position along the linear arrangement of scale segments.

8. A camera exposure information display device comprising:
   means for generating a first code signal representing a degree and direction of deviation of a preset exposure condition from a proper exposure value and a second code signal representing an automatically set exposure condition, said generating means including means for alternatively outputting said first code signal and said second code signal;
   a display substrate;
   scale display means including a plurality of scale segments linearly arranged on said substrate in spaced relationship with each other;
   character display means including at least one character display element arranged on said substrate, said display element substantially surrounding at least one of said scale segments and having portions interposed between adjacent scale segments of said scale display means; and
   means for driving said scale display means in response to said first code signal and for driving said character display means in response to said second code signal.

9. An information display device according to claim 8, wherein said scale segments are of substantially the same size and shape and arranged at regular intervals.

10. An information display device according to claim 8, wherein said display element substantially surrounds only one of said scale segments.

11. An information display device according to claim 8, wherein said display element comprises a plurality of character segments arranged to display numeric information.

12. An information display device according to claim 11, wherein at least two of said character segments are interposed each between a different pair of adjacent scale segments.

13. An information display device comprising:
    a display substrate;
    scale display means including a plurality of scale segments linearly arranged on said substrate in spaced relationship with each other; and
    character display means including a plurality of character display elements arranged on said substrate, each said display element substantially surrounding a different scale segment of said scale display means and having respective portions interposed between adjacent scale segments of said scale display means.

14. An information display device according to claim 13, further comprising means for alternatively driving said scale display means and said character display means.

15. An information display device according to claim 13, wherein said scale segments are of substantially the same size and shape and arranged at regular intervals.

16. An information display device according to claim 13, wherein each of said display elements comprises a plurality of character segments arranged to display numeric information.

17. An information display device according to claim 16, wherein at least two of said character segments of each said display element are interposed each between a different pair of adjacent scale segments.

* * * * *